US011108150B2

(12) United States Patent
Izquierdo Fernandez et al.

(10) Patent No.: US 11,108,150 B2
(45) Date of Patent: Aug. 31, 2021

(54) RADOME FOR VEHICLES

(71) Applicant: ZANINI AUTO GRUP, S.A., Barcelona (ES)

(72) Inventors: Benjamin Izquierdo Fernandez, Barcelona (ES); Pol Tutusaus Carrete, Barcelona (ES)

(73) Assignee: ZANINI AUTO GRUP, S.A., Barcelona (ES)

( * ) Notice: Subject to any disclaimer, the term of this patent is extended or adjusted under 35 U.S.C. 154(b) by 0 days.

(21) Appl. No.: 16/961,446

(22) PCT Filed: Jan. 10, 2018

(86) PCT No.: PCT/ES2018/070016
§ 371 (c)(1),
(2) Date: Jul. 10, 2020

(87) PCT Pub. No.: WO2019/138142
PCT Pub. Date: Jul. 18, 2019

(65) Prior Publication Data
US 2021/0083374 A1   Mar. 18, 2021

(51) Int. Cl.
*H01Q 1/42*   (2006.01)
*H01Q 1/32*   (2006.01)
*H04N 5/225*  (2006.01)

(52) U.S. Cl.
CPC ........... *H01Q 1/422* (2013.01); *H01Q 1/3233* (2013.01); *H04N 5/2257* (2013.01)

(58) Field of Classification Search
CPC ..... H01Q 1/422; H01Q 1/3233; H04N 5/2257
See application file for complete search history.

(56) References Cited

U.S. PATENT DOCUMENTS

| 3,936,736 | A | * | 2/1976 | Ray | G01N 22/00 |
| | | | | | 324/642 |
| 5,408,244 | A | * | 4/1995 | Mackenzie | H01Q 1/422 |
| | | | | | 343/872 |
| 5,631,663 | A | * | 5/1997 | David | H01Q 1/424 |
| | | | | | 343/872 |
| 6,107,976 | A | * | 8/2000 | Purinton | H01Q 1/42 |
| | | | | | 343/872 |
| 6,627,296 | B1 | * | 9/2003 | Tudela | B32B 3/12 |
| | | | | | 428/182 |

(Continued)

FOREIGN PATENT DOCUMENTS

DE   102016010441 A1   2/2017
KR      101251979 B1   4/2013

OTHER PUBLICATIONS

International Search Report for PCT/ES2018/070016 dated Sep. 19, 2018.

*Primary Examiner* — Lam T Mai
(74) *Attorney, Agent, or Firm* — Kutak Rock LLP

(57) ABSTRACT

A radome for vehicles comprising an internal base layer (1) formed of a radio transmissive resin; an intermediate decoration layer (2); and an external transparent resin layer (3), which is characterized in that the radome also comprises a camera (4) placed inside the radome or aligned with the external surface of the transparent resin layer (3). It allows more freedom for car designers by offering an integrated solution which is aesthetically pleasant, and it decreases part manufacturing complexity.

8 Claims, 4 Drawing Sheets

(56) References Cited

U.S. PATENT DOCUMENTS

| | | | | |
|---|---|---|---|---|
| 7,463,212 | B1* | 12/2008 | Ziolkowski | H01Q 1/42 |
| | | | | 343/872 |
| 9,123,998 | B1* | 9/2015 | LoRe | H01Q 1/50 |
| 2004/0004576 | A1* | 1/2004 | Anderson | H01Q 21/064 |
| | | | | 343/770 |
| 2010/0103072 | A1* | 4/2010 | Wu | H01Q 1/002 |
| | | | | 343/872 |
| 2011/0256329 | A1* | 10/2011 | Thomas | C03B 19/1492 |
| | | | | 428/34.6 |
| 2014/0159942 | A1 | 6/2014 | Shi | |
| 2014/0292612 | A1* | 10/2014 | Boutigny | H01Q 3/08 |
| | | | | 343/872 |
| 2017/0207514 | A1* | 7/2017 | Kamo | B32B 27/285 |
| 2018/0159211 | A1* | 6/2018 | Biancotto | H01Q 1/421 |
| 2019/0103668 | A1* | 4/2019 | Stressing | B32B 27/36 |
| 2020/0127373 | A1* | 4/2020 | Bilik | H01Q 15/08 |

\* cited by examiner

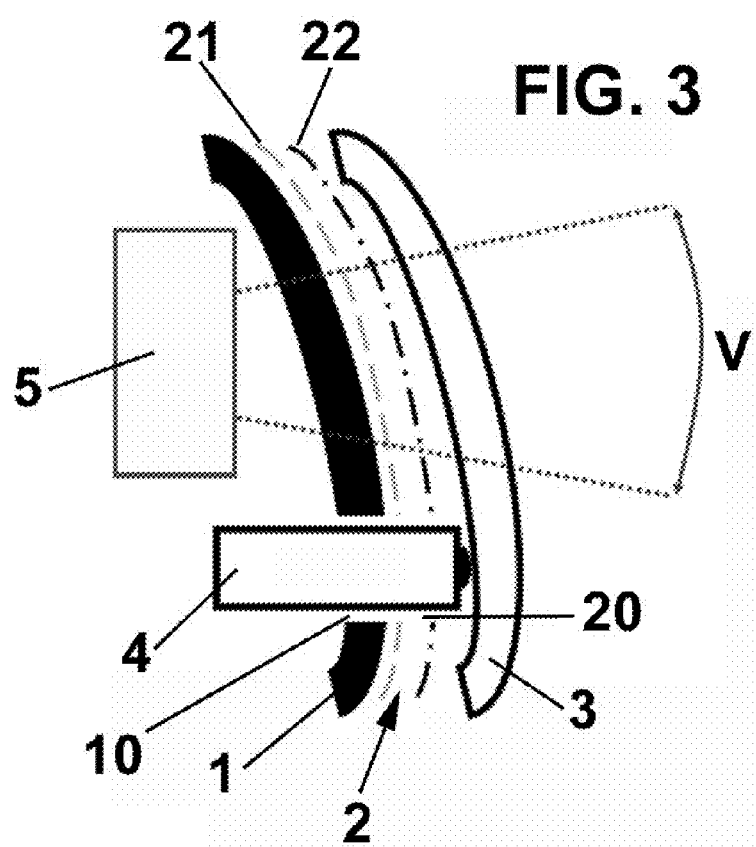

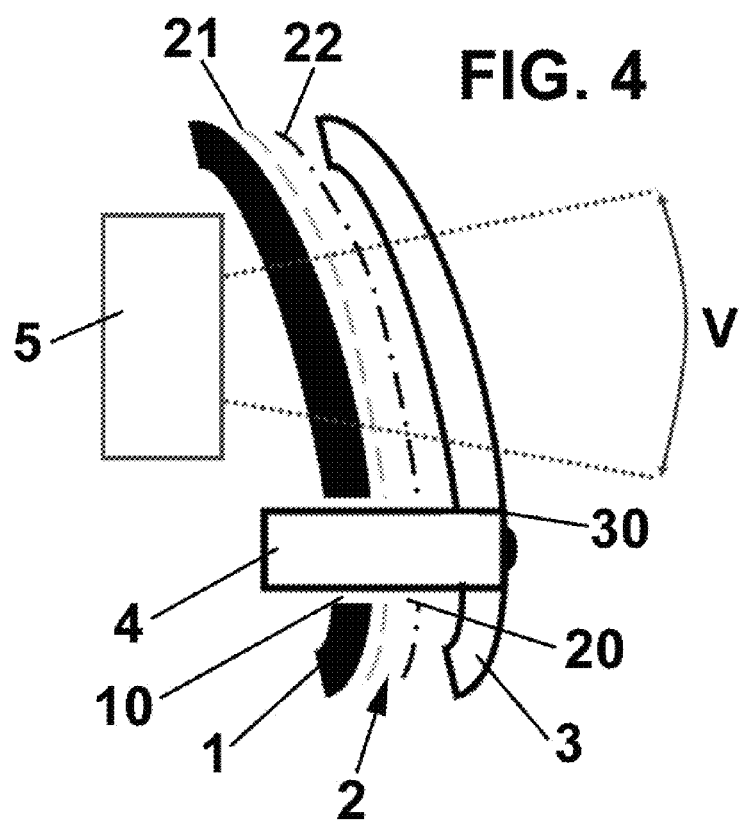

RADOME FOR VEHICLES

This is the United States National Stage of Patent Cooperation Treaty Application No. PCT/ES2018/070016 filed Jan. 18, 2010, the disclosures of which are incorporated herein by reference in their entireties.

The present invention refers to a radome for protecting sensors enabling autonomous driving while presenting an outstanding aesthetical appearance, especially for radar devices disposed behind the front grill of an automobile.

BACKGROUND OF THE INVENTION

In general, radio transmitter-receiver devices, such as a millimeter-wave radar, have been employed as sensors for vehicular collision avoidance and adaptive cruise control systems.

In a radar system or the like that measures obstacles in front of an automobile and the distance between automobiles, the antenna was preferably positioned in the center at the front of the vehicle to obtain maximum performance. Although the radar antenna could be installed near the front grill of automobile, it was preferable to conceal the antenna from view due to its non-aesthetic appearance and to shield the antenna from external environmental factors such as weather and airborne contaminants.

To protect the antenna and avoid radio interference and signal losses of the radar device, it has been proposed to provide a radar window capable of transmitting radio waves in the front grill corresponding where the radar antenna was located. This allowed radio waves to pass in and out through the window.

Premium radomes reproduce the brand logo/emblem. Most of today's premium radomes have a transparent resin on top to protect inner decoration layers, mainly composed of metallic looking decoration and black paint. Another resin layer on the rear side acts as a substrate to complete the protection of the decoration layers. Radome surface exceeds the radar field of view to avoid distortion of radar waves.

Outside the radar field of view, a camera for advanced driving assistance functions, or parking assistance functions, can be placed and the camera lens integrated with the transparent resin overlying the radome decoration layers.

In those radomes, the presence of metallic decoration outside the radar field of view does not allow to integrally hide the camera lens behind a portion of such metallic decoration.

Some radomes available today in the market have a hole across the whole radome layer stack, but it is aesthetically not desirable having holes or protrusions on the topmost radome layer when it represents the automobile manufacturer emblem, as it modifies the brand image and makes it harder to identify.

There is also a risk that water deposited on the top transparent resin eventually leaks through the whole to the inner radome layers or even the camera, and sealing the radome around the camera lens is difficult and adds further complexity to the radome.

U.S. Pat. No. 8,604,968 B2 and US 2014/0159942 A1 disclose a sensor assembly of camera and radar with common housing. Both sensors have complementary features that enhance the performance of Advanced Driver Assistance Systems.

The assembly disclosed in U.S. Pat. No. 8,604,968 B2 is to be deployed behind the windshield. This presents several drawbacks:

Both camera and radar can be seen from the outside of the vehicle by a casual observer, so aesthetically speaking it is not a pleasant solution.

Location behind the windshield limits the angular range both in azimuth and elevation in which the radar can work without substantial performance degradation.

The assembly disclosed in US 2014/0159942 A1 also has some limitations:

A partial radome is included in the camera and radar housing. The radome, however, only covers the radar sensor, so that camera field of view is unobstructed. Hence, camera can be seen from the outside of the vehicle by a casual observer, so aesthetically speaking it is not a pleasant solution.

Both inventions are limited by the fact that the radar is placed behind the windshield, which introduces a significant amount of attenuation. Thus, maximum detection range is decreased. Safety is also at risk in high speed environments, such as highways, where low-speed vehicles (goods transportation, for instance) and high-speed vehicles (sportive vehicles) coexist. The reduced range therefore leads to shorter response times which, at such speed differences among vehicles, will decrease performance of advanced safety functions.

US 2007/0110987 A1, from the same inventor as this application, describes a luminous emblem visible during diurnal and nocturnal visibility conditions. A plastic support with local opaque and transparent areas, and a thin metal layer using PVD technique is applied, providing a metallic appearance with light turned off, and a backlit pattern when turned on. It does not mention, though, the use of this emblem other than for decorative purposes.

Therefore, the object of the present invention is to overcome these limitations, providing other advantages that will be disclosed hereinafter.

SUMMARY OF THE INVENTION

The radome for vehicles according to the present invention comprises the features according to claim 1. Additional optional features are disclosed in the dependent claims.

The radome for vehicles according to the present invention comprises:
- an internal base layer formed of a radio transmissive resin;
- an intermediate decoration layer; and
- an external transparent resin layer, and it is characterized in that the radome also comprises a camera placed inside the radome or aligned with the external surface of the transparent resin layer, i.e. without any holes or protrusions on the frontal surface of the external transparent resin layer, which is also the frontal surface of the radome.

According to four different embodiments:
- the camera is placed behind the internal base layer,
- the camera is placed behind the intermediate decoration layer and crosses a hole provided in the internal base layer,
- the camera is placed behind the external transparent resin layer and crosses holes provided in the internal base layer and in the intermediate decoration layer, or
- the camera crosses holes provided in the internal base layer, in the intermediate decoration layer and in the external transparent resin layer, the frontal end of the camera being aligned with the frontal surface of the external transparent resin layer.

Preferably, the intermediate decoration layer comprises a first metallic looking decoration layer and a second dark decoration layer, and the external transparent resin layer is curved.

Advantageously, the radome comprises a radar field of view and the camera is placed outside this radar field of view.

The present invention provides at least the following advantages:
- It allows more freedom for car designers by offering an integrated solution which is aesthetically pleasant;
- It decreases part manufacturing complexity;
- It decreases manufacturing costs;
- It increases part robustness;
- The topmost transparent resin can be locally adapted to the camera lens curvature to optimize the visibility and decrease reflections coming from the change of media;
- Camera lens is also protected from environmental conditions and chemical attacks by the topmost transparent resin layer, and enlarges the lifespan of the camera;
- Camera manufacturing cost can be decreased, as it needs to fulfil less stringent requirements;
- It is a better aesthetical solution than the described above, as camera is less visible for the observer;
- The camera lens can have darker tones, ranging from dark grey to black; and
- It provides more freedom design in the vehicle front area, as two elements (radar and camera) have been hidden together behind the same plastic trim.

BRIEF DESCRIPTION OF THE DRAWINGS

FIG. 3 is a cross-section view of a third embodiment of the radome according to the present invention; and FIG. 4 is a cross-section view of a fourth embodiment of the radome according to the present invention.

DESCRIPTION OF PREFERRED EMBODIMENTS

Figure 1:
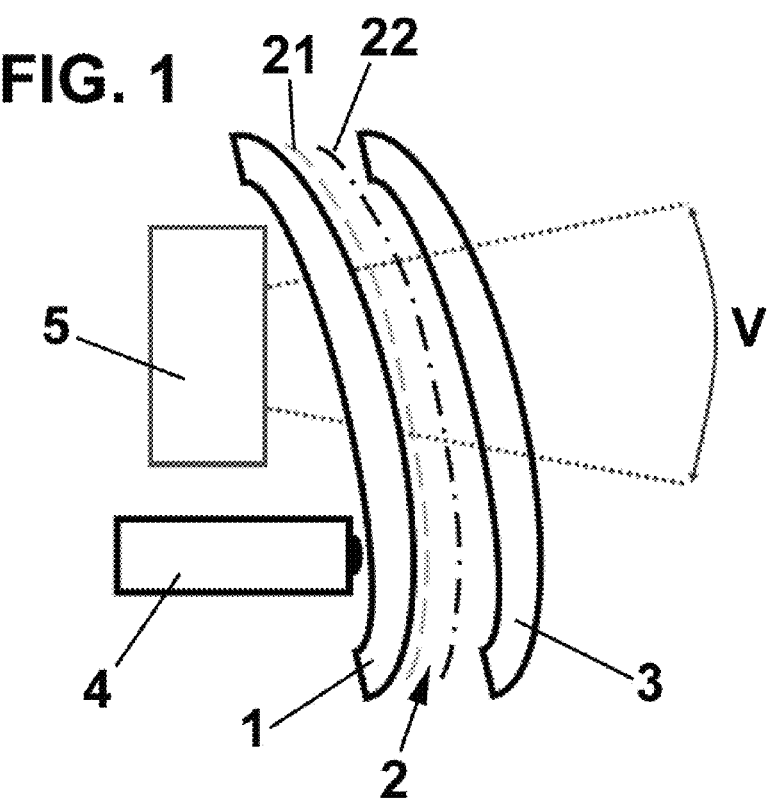
FIG. 1 is a cross-section view of a first embodiment of the radome according to the present invention.

The radome according to the present invention comprises an internal base layer 1 formed of a radio transmissive resin, an intermediate decoration layer 2 and an external transparent resin layer 3.

The intermediate decoration layer 2 is preferably formed by two layers, a metallic looking decoration layer 21 and a dark decoration layer 22.

The metallic looking decoration layer 21 is deposited preferably over the internal base layer 1 by means of PVD magnetron sputtering, with a combination of several layers of metalloid elements, such as silicon and/or germanium.

According to the present invention, the radome also comprises a camera 4, which is placed inside the radome (embodiments of FIGS. 1-3) or aligned with the external surface of the transparent resin layer 3 (embodiment of FIG. 4), i.e. the external surface of the transparent resin layer 3 (and therefore the external surface of the radome) is kept intact, without any holes or protrusions, except in the last embodiment.

As shown in the drawings, the external transparent resin layer 3 can be curved and locally adapted to the camera lens curvature to optimize the visibility and decrease reflections coming from the change of media.

The aesthetics of the radome can be further enhanced if the metallic looking decoration layer 21 thickness is such that it provides a translucent effect, and optical waves are partially reflected (mirror effect), so what lies behind such decoration layer, e.g. the camera, is concealed from the view of a casual observer, and optical waves are partially transmitted, thus allowing the camera to preserve its functionality by being able to receive the surrounding light without significant performance degradation.

Values for the optical reflectivity and transmissivity which can be deemed a good compromise for the trade-off between aesthetics and camera functionality lie, e.g. between 50-80% for reflectivity and 50-20% for transmissivity.

When the radome according to the invention is used in a vehicle, a radar 5 is placed behind the radome, and a radar field of view V is defined in the radome. To prevent any interference in this radar field of view V, the camera 4 is placed outside this radar field of view V, as shown in the drawings.

Four different embodiments for placing the camera 4 in the radome according to the present invention are shown in the drawings.

According to a first embodiment, shown in FIG. 1, the camera 4 is placed behind the internal base layer 1.

Figure 2:
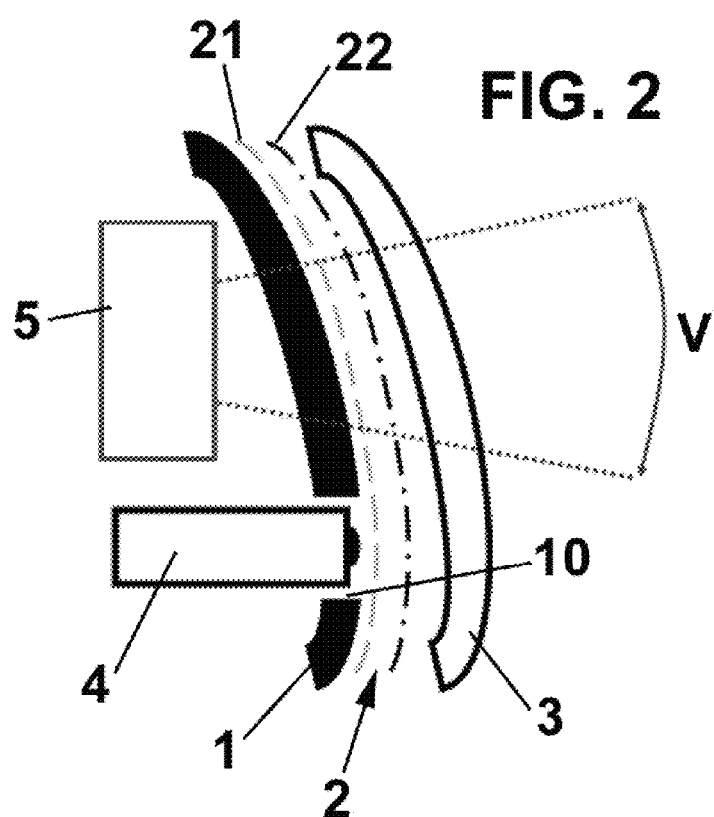
FIG. 2 is a cross-section view of a second embodiment of the radome according to the present invention.

According to a second embodiment, shown in FIG. 2, the camera 4 is placed behind the intermediate decoration layer 2 and crosses a hole 10 provided in the internal base layer 1.

According to a third embodiment, shown in FIG. 3, the camera 4 is placed behind the external transparent resin layer 3 and crosses holes 10, 20 provided in the internal base layer 1 and in the intermediate decoration layer 2.

According to a fourth embodiment, shown in FIG. 4, the camera 4 crosses holes 10, 20, 30 provided in the internal base layer 1, in the intermediate decoration layer 2 and in the external transparent resin layer 3, the frontal end of the camera 4 being aligned with the frontal surface of the external transparent resin layer 3.

Since various possible embodiments might be made of the present invention and since various changes might be made in the exemplary embodiments shown herein without departing from the spirit of the invention, is to be understood that all matter herein described or shown in the accompanying drawings is to be interpreted as illustrative and not in a limiting sense.

The invention claimed is:

1. A radome for vehicles comprising:
   an internal base layer (1) formed of a radio transmissive resin;
   an intermediate decoration layer (2); and
   an external transparent resin layer (3), characterized in that the radome also comprises a camera (4) placed inside the radome or aligned with the external surface of the transparent resin layer (3).

2. The radome for vehicles according to claim 1, wherein the camera (4) is placed behind the internal base layer (1).

3. The radome for vehicles according to claim 1, wherein the camera (4) is placed behind the intermediate decoration layer (2) and crosses a hole (10) provided in the internal base layer (1).

4. The radome for vehicles according to claim 1, wherein the camera (4) is placed behind the external transparent resin layer (3) and crosses holes (10, 20) provided in the internal base layer (1) and in the intermediate decoration layer (2).

5. The radome for vehicles according to claim 1, wherein the camera (4) crosses holes (10, 20, 30) provided in the internal base layer (1), in the intermediate decoration layer (2) and in the external transparent resin layer (3), the frontal end of the camera (4) being aligned with the frontal surface of the external transparent resin layer (3).

6. The radome for vehicles according to claim 1, wherein the intermediate decoration layer (2) comprises a first metallic looking decoration layer (21) and a second dark decoration layer (22).

7. The radome for vehicles according to claim 1, wherein the external transparent resin layer (3) is curved.

8. The radome for vehicles according to claim 1, wherein the radome comprises a radar field of view (V) and the camera (4) is placed outside this radar field of view (V).

* * * * *